United States Patent
Artobello et al.

(10) Patent No.: US 7,308,617 B2
(45) Date of Patent: Dec. 11, 2007

(54) APPARATUS, SYSTEM, AND METHOD FOR AUTOMATICALLY FREEING A SERVER RESOURCE LOCKED AWAITING A FAILED ACKNOWLEDGEMENT FROM A CLIENT

(75) Inventors: Michael Richard Artobello, Concord, CA (US); Gerald Dean Hughes, Morgan Hill, CA (US); Steve T. Kuo, San Jose, CA (US); Stephen Paul Nathan, Piscataway, NJ (US); Paul Dennis Seyforth, Arnold, CA (US); Yoshinobu Ueno, San Jose, CA (US); Jack Chiu-Chiu Yuan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 10/870,410

(22) Filed: Jun. 17, 2004

(65) Prior Publication Data
US 2006/0069775 A1    Mar. 30, 2006

(51) Int. Cl.
*G06F 11/00*    (2006.01)
(52) U.S. Cl. ............................. 714/55; 714/4
(58) Field of Classification Search ................... 714/55
See application file for complete search history.

(56) References Cited

U.S. PATENT DOCUMENTS 5,245,616 A     9/1993   Olsen .......................... 371/32
5,388,254 A *   2/1995   Betz et al. ..................... 714/16
5,396,613 A *   3/1995   Hollaar ........................... 714/4
5,581,794 A *  12/1996   Lin et al. ....................... 710/58

(Continued)

FOREIGN PATENT DOCUMENTS

EP          0676696         10/1995

(Continued)

OTHER PUBLICATIONS

A. Dixit et al., "Method of Maintaining Continuity of Messages Over Publish/Subscribe System Failure", RC, vol. 41, No. 414, Oct. 1998.

(Continued)

*Primary Examiner*—Yolanda L Wilson
(74) *Attorney, Agent, or Firm*—Kunzler & McKenzie (57) ABSTRACT

An apparatus, system, and method are provided for automatically freeing locked server resources using a timeout value closely related to actual real-time message delays plus a delta value that can be adjusted at a plurality of levels. The levels include default, server, connection, and transaction. The apparatus includes a timer, a communication module, a computation module, and a lock handler. The timer determines a timeout value for communications from a client to a server. The communication module sends an output message to the client and locks a server resource in anticipation of an acknowledgement (ACK) message from the client. The computation module, which calculates an ACK timer, includes a difference between a send time and a current time. If no ACK message has been received from the client and the ACK timer exceeds the timeout value, the lock handler may free the locked server resource.

20 Claims, 6 Drawing Sheets

U.S. PATENT DOCUMENTS

| | | | |
|---|---|---|---|
| 6,141,322 A | 10/2000 | Poretsky | 370/231 |
| 6,247,058 B1 | 6/2001 | Miller et al. | 709/234 |
| 6,401,127 B1 | 6/2002 | Lei et al. | 709/235 |
| 6,405,337 B1 | 6/2002 | Grohn et al. | 714/749 |
| 6,470,031 B1 | 10/2002 | Loy et al. | 370/503 |
| 6,594,787 B1* | 7/2003 | Chesson | 714/56 |
| 6,631,009 B1 | 10/2003 | Thomas et al. | 358/1.15 |
| 6,775,707 B1* | 8/2004 | Bennett et al. | 709/233 |
| 2002/0152432 A1 | 10/2002 | Fleming | 714/47 |
| 2003/0037294 A1* | 2/2003 | Robsman et al. | 714/55 |
| 2003/0204792 A1 | 10/2003 | Cahill et al. | 714/55 |
| 2003/0217068 A1 | 11/2003 | Fruchtman et al. | 707/101 |
| 2004/0037233 A1* | 2/2004 | Suzuki et al. | 370/252 |

FOREIGN PATENT DOCUMENTS

| | | |
|---|---|---|
| GB | 2330 431 | 4/1999 |
| JP | 2000267894 | 9/2000 |

OTHER PUBLICATIONS

"IMS TCP/IP OTMA Connection User's Guide and Reference" Version 2.1.3, pp. 1-3, 1998.

Jouko Jantti et al., "IMS e-business Connectors A Guide to IMS Connectivity", Chapter 3, pp. 26-30.

Jouko Jantti et al., "IMS e-business Connectors A Guide to IMS Connectivity", Chapter 10, pp. 125-135.

* cited by examiner (Prior Art)
Fig. 1

APPARATUS, SYSTEM, AND METHOD FOR AUTOMATICALLY FREEING A SERVER RESOURCE LOCKED AWAITING A FAILED ACKNOWLEDGEMENT FROM A CLIENT

BACKGROUND OF THE INVENTION

1. Field of the Invention

The invention relates to client server communications. Specifically, the invention relates to apparatus, systems, and methods for automatically freeing a server resource locked awaiting a failed acknowledgement from a client.

2. Description of the Related Art

Client-server communications characterize a large part of the inter-process communication in today's computer systems and networks. In particular, database servers provide database data and results to a plurality of clients. The database servers often support a plurality of protocols and connect to clients over a variety of networks. However, the expected performance of the database server remains the same.

Certain database servers, such as IBM's Information Management System (IMS), are expected to maintain high performance expectations due to the nature of the data managed in the database. The performance expectations remain high regardless of the quality of the network connection and/or protocol between the client and the server or the capabilities of the client. Furthermore, such database servers are expected to service large volumes of transactions almost simultaneously. Transactions need to be completed as quickly as possible. The database servers are required to operate 24/7 with any down time kept to an absolute minimum. Large corporations and other entities invest heavily in the speed, reliability, and security provided by such database servers.

Data maintained by the database servers is often very critical to the owner of the data and/or the user. The data may comprise financial data, sales transaction data, and the like. Consequently, certain transactions between the client and server can be mission critical, meaning the client and server are to cooperate to ensure that all messages exchanged are properly received by the receiver (client/server). To ensure proper receipt of a message, the communication protocol generally requires that the receiver provide an acknowledgement (ACK) message to the sender. The ACK message confirms that the last message sent by the sender was properly received by the receiver.

Figure 1:
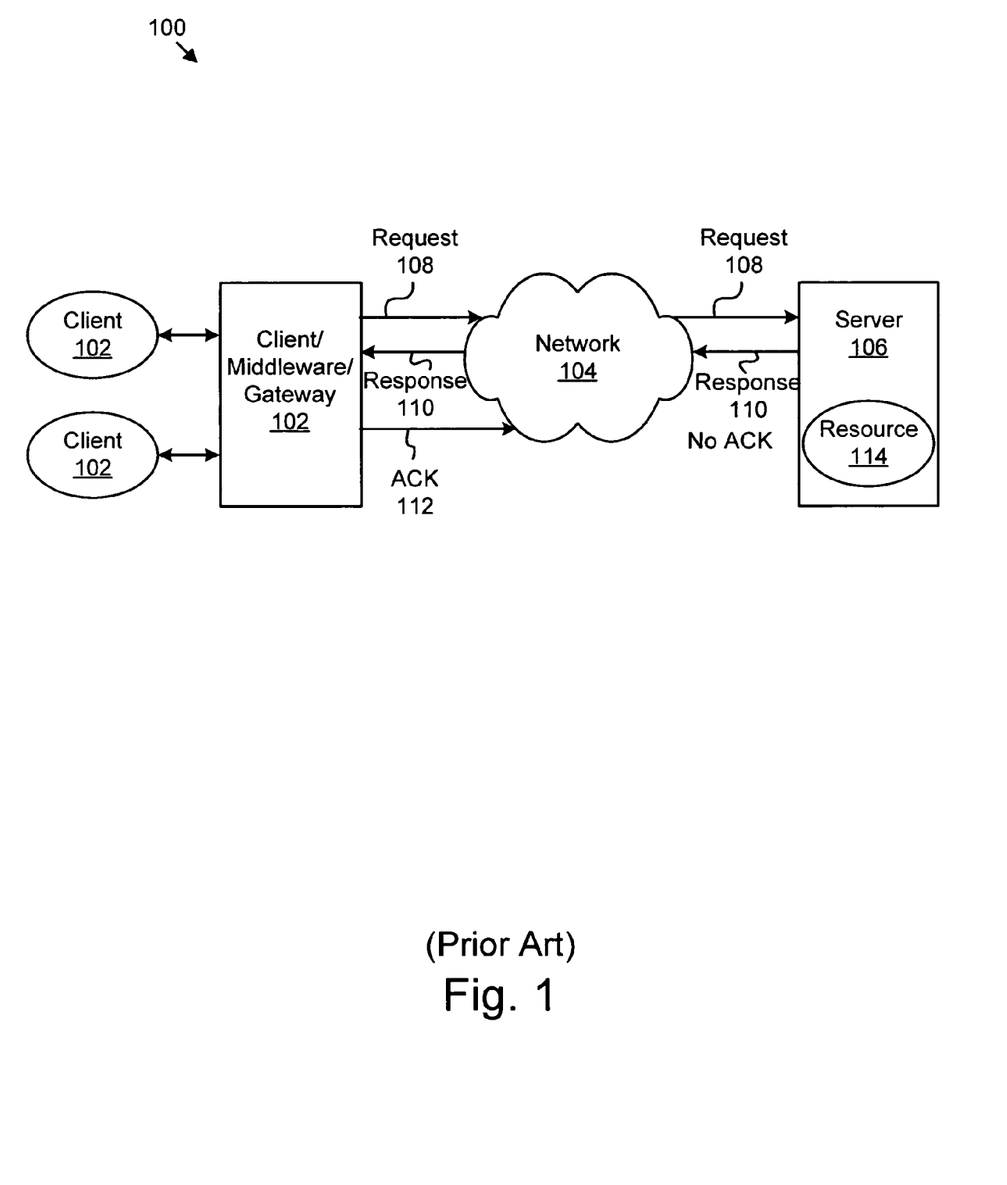
FIG. 1 is a schematic block diagram illustrating a conventional system that locks server resources in anticipation of a failed acknowledgement from the client.

FIG. 1 illustrates a conventional system 100 in which an ACK message is to be sent. The system 100 includes a client 102, a network 104, and a server 106. The server 106 is a combination of hardware and/or software executing various operating systems, such as Multiple Virtual Storage (MVS), OS/390, zSeries/Operating System (z/OS), UNIX, Linux, and the like.

The client 102 may comprise a web-based client, a middleware software module, a gateway application, or any other software module configured to communicate directly with the server 106. Representative examples of clients 102 include Tivoli®, DB2®, MQseries®, IMS connect, and the like. FIG. 1 illustrates that the client 102 may communicate with end-user "clients 102." For clarity, references hereinafter to a "client 102" refer to any software application configured to communicate directly with the server 106.

Generally, the client 102 initiates a communication session with the server 106 by sending a request 108 over the network 104. The network 104 may comprise direct terminal connections, a Local Area Network (LAN), Wide Area Network (WAN), the Internet, or the like. Typically, the client 102 establishes a connection to the server 106 prior to sending the request 108. The request 108 initiates a transaction. A transaction may include the exchange of a plurality of messages until sufficient operations are completed such that the transaction can be successfully ended. Furthermore, the client 102 can typically identify mission critical transactions for the server 106 to complete. Accordingly, a network communication protocol, such as Transmission Control Protocol/Internet Protocol (TCP/IP) or the like, requires that the server 106 retain results of a transaction until the client 102 provides an ACK message indicating that the result message was properly received and uncorrupted. Other types of transactions may not require an ACK message from the client 102.

In FIG. 1, the client 102 sends a request 108 to the network 104 which relays the request 108 to the server 106. The server 106 performs the operations indicated in the request 108 and sends a response 110 to the network 104. Typically, between a client 102 and a database server 106, the response 110 comprises results of a database transaction. Once the response 110 is sent, the server 106 waits for an ACK message 112 from the client 102.

Because the transaction is mission critical, the server 106 reserves or locks certain server resources 114 until the ACK message 112 is received. Typically, the server resources 114 are the resources of the server required to reproduce the results. Examples of certain server resources 114 may include memory sections, buffers, communication channels/sockets, record/table locks, and the like.

Unfortunately, the server 106 does not always receive the ACK message 112. In some cases, the client 102 may send an ACK message 112 to the network 104, but some intermediate node (not shown) in the network 104 may fail to relay the ACK message 112. Certain types of networks 104, such as a TCP/IP network, may be more prone to such a problem. In other cases, the client 102 may erroneously fail to transmit an ACK message 112.

In either case, the result is the same. The server 106 has locked certain resources 114 in anticipation of an ACK message 112 that will never arrive. Conventionally, the locked resources 114 must be freed manually by a server administrator interacting with the server 106.

The server 106 has a finite number of the resources 114. Consequently, as additional transactions are serviced that indefinitely lock additional resources 114, all the resources 114 inevitably become locked. The server 106 is then unable to accept any new transactions or may go off-line.

From the foregoing discussion, it should be apparent that a need exists for an apparatus, system, and method that automatically free a server resource locked awaiting a failed acknowledgement from a client. Beneficially, such an apparatus, system, and method would free the server resource in response to a timeout value that corresponds to current delays in communications between the client and the server. In addition, the apparatus, system, and method would allow such a timeout value to be extended by a default value, a server level value, a connection level value, or a transaction level value. In addition, such an apparatus, system, and method would provide notification that an ACK message was not received and queue the unacknowledged message for subsequent delivery after the server resources are freed.

SUMMARY OF THE INVENTION

The present invention has been developed in response to the present state of the art, and in particular, in response to the problems and needs in the art that have not yet been met for freeing a locked server resource in anticipation of a failed ACK message. Accordingly, the present invention has been developed to provide an apparatus, system, and method for freeing a locked server resource awaiting a failed ACK message that overcomes many or all of the above-discussed shortcomings in the art.

An apparatus according to the present invention includes a timer, a communication module, a computation module, and a lock handler. The timer determines a timeout value for communications from a client to a server. The timeout value comprises an average message round-trip delay between a server and a client plus a default delta value. In certain embodiments, a separate timeout value is determined for each of a plurality of clients communicating with the server.

Preferably, the default delta value is dynamically adjustable using a plurality of mechanisms and at various levels of applicability. The average message round-trip delay may be computed based on an average of all message exchanges between the client and server, all messages that required an ACK message, or a predefined number of previous message exchanges.

The communication module sends an output message to the client at a send time. The communication module may also lock a server resource in anticipation of an acknowledgement (ACK) message from the client. Typically, the communication module locks (reserves) the server resource used to generate the output message, although other server resources may be locked to ensure that the output message can be reproduced and resent if needed.

The computation module calculates an ACK timer comprising a difference between the send time and a current time. The computation module may repeatedly calculate the ACK timer. If no ACK message has been received from the client and the ACK timer exceeds the timeout value, the lock handler may free the locked server resource. In certain embodiments, the communication module may send a notification regarding the freeing of the locked server resource to the client and/or a server administrator.

In certain embodiments, the default delta value is predefined such that the apparatus frees the locked resource without user intervention. The apparatus may include a server controller, a connection controller, and a transaction controller. The server controller may allow a server administrator to set a server delta value that is used in place of the default delta value so long as the server delta value is not set to a predefined value.

The connection controller and transaction controller allow a client to set a connection delta value and transaction delta value respectively. The connection delta value is used in place of the default delta value and server delta value if the server delta value is not set or the connection delta value is less than the server delta value. Similarly, the transaction delta value is used in place of the default delta value, server delta value, and connection delta value if the server delta value is not set or the transaction delta value is less than the server delta value.

In certain embodiments, if the server delta value is set to a predefined value such as zero, the apparatus may notify the client and a server administrator of the locked server resource but not automatically free the server resource. In this manner, a server administrator can advantageously deactivate the automatic resource freeing operation and still receive notifications of the locked resources.

A method of the present invention is also presented for freeing a server resource locked awaiting a failed acknowledgement from a client. In one embodiment, the method includes determining a timeout value for communications between a server and a client, the timeout value comprising an average message round-trip time delay between the server and the client plus a default delta value. In addition, the method sends an output message to the client at a send time and locks a server resource in anticipation of an acknowledgement (ACK) message from the client. The method also calculates an ACK timer comprising a difference between the send time and a current time. Additionally, the method frees the server resource in response to the ACK timer exceeding the timeout value and not receiving an ACK message from the client.

In further embodiments, the method also may include composing and sending an error message selectively to a server controller and a client, the error message describing communication attributes when the server resource is freed without an ACK message from the client. Still further, the method may include backing out a client-server transaction which is a database transaction without performing a commit operation and including confirmation of the backout operation in an error message in response to the database transaction comprising a send-then-commit type of transaction. In addition, the method may include committing a client-server transaction that is a database transaction, including confirmation of the commit operation in an error message in response to the database transaction comprising a commit-then-send type of transaction.

The present invention also includes embodiments arranged as a system and machine-readable instructions that comprise substantially the same functionality as the components and steps described above in relation to the apparatus and method. The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

It will be readily understood that the components of the present invention, as generally described and illustrated in the Figures herein, may be arranged and designed in a wide variety of different configurations. Thus, the following more detailed description of the embodiments of the apparatus, system, and method of the present invention, as presented in the Figures, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

It is contemplated that embodiments of the present invention may be used with any transaction architecture in which certain transaction messages require that a sender receive an ACK message from a receiver before locked resources of the sender are freed. Representative examples include client-server architectures, client applications executing transactions on database servers, and the like.

Figure 2:
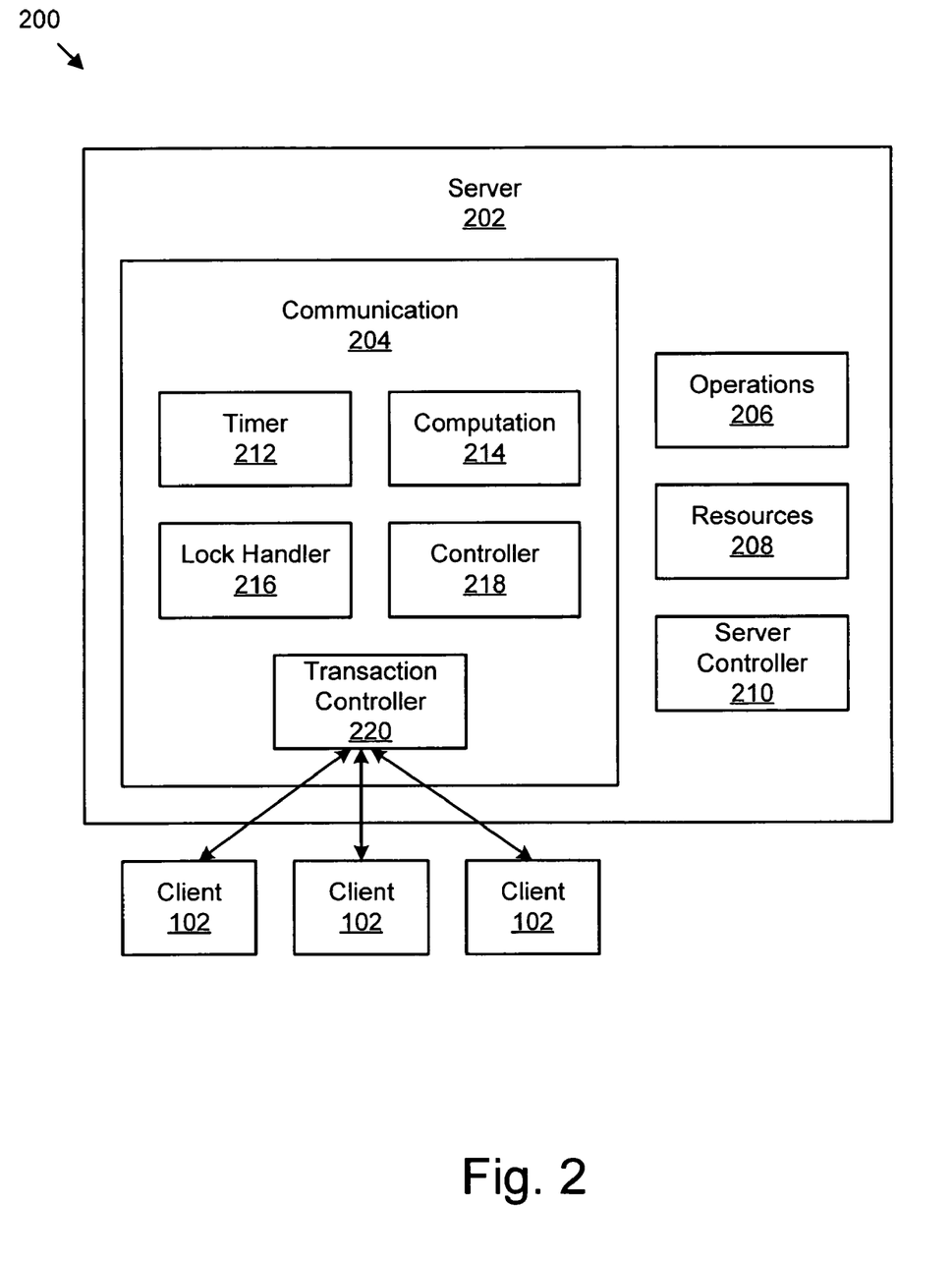
FIG. 2 is a schematic block diagram illustrating one embodiment of an apparatus in accordance with the present invention.

FIG. 2 illustrates a logical block diagram of an apparatus 200 configured to free a server resource locked awaiting a failed acknowledgement from a client. In one embodiment, the apparatus 200 is implemented within a server 202 such that server resources can automatically be freed if an expected ACK message is not received. By implementing the present invention in the server 202, a plurality of clients 102, including end-user clients, gateway applications, and middleware applications including other servers, benefit from higher availability of the server 202 without any code changes to the respective clients 102. As mentioned above, server resources that are locked indefinitely, or until manually freed, quickly result in a server resource shortage that may cause the server to go off-line.

The server 202 may include a communication module 204, an operations module 206, one or more resources 208, and, optionally, a server controller 210. Of course, the server 202 may include a variety of other components that are not illustrated in FIG. 2 for clarity. Preferably, the server 202 is one or more software components operating on a hardware platform and an operating system such as, for example, Multiple Virtual Storage (MVS), OS/390, zSeries/Operating System (z/OS), UNIX, Linux, Windows, and the like.

The communication module 204 manages sending and receiving of messages between the server 202 and one or more clients 102. The communication module 204 may operate using a variety of communication protocols and interfaces including Token Ring, Transmission Control Protocol/Internet Protocol (TCP/IP), and the like. Preferably, the communication module 204 is involved in all communication messages between a client 102 and the server 202. The communication module 204 receives client requests, establishes connections, and manages resources 208 as needed to satisfy the client requests.

The operations module 206 executes one or more processes to implement the desired functionality of the server 202. These operations may include servicing database requests, completing batch processing jobs, performing web services, implementing a sales or ordering transaction, and the like. The apparatus 200 separates the communications functions, communication module 204, from the computations functions performed in the operations module 206. Consequently, the present invention may be implemented in a variety of different kinds of servers 202. In certain embodiments, the server 202 may interact with a client 102 under a more peer-to-peer model. It is contemplated that the present invention may be implemented in both client-server models and peer-to-peer models.

The resources 208 comprise a variety of computing resources available within the server 202. Examples of resources 208 include, but are not limited to, memory structures, buffers, communication data structures, control data structures, communication channels, program execution threads, program control regions, and the like. It is contemplated that resources 208 include any hardware or software module of the server 202 that is specifically designated, reserved, tasked, or locked in order to fulfill a request from a client 102.

In particular, the resource 208 is locked until the client 102 making the request acknowledges that the result has been properly received from the server 202 by way of an ACK message. Typically, the resource 208 comprises a finite characteristic such that given a sufficient number of client requests all the resources become locked. Normally, if the ACK message is received, the locked resource 208 is freed and returned to a free resource pool for use in a subsequent client request.

For example, in one embodiment, the server 202 may comprise an IMS® transaction and database server available from IBM. In such a server 202, the resources 208 may comprise a finite number of program regions that are locked in order to satisfy a specific transaction request from a client 102. Certain transaction requests may lock the program region until the server 202 receives an ACK message from the client 102 indicating that the result of the transaction was properly received by the client 102. Such transaction requests may be referred to as mission critical transactions and include, for example, banking transactions.

As mentioned above, in conventional servers, if the ACK message is not received, the server continues to maintain the lock on the resource involved in the particular transaction. Consequently, as the server continues to service additional transaction requests, additional resources may be locked due to failed ACK messages until eventually all resources are locked, causing no more client requests to be serviced.

In one embodiment, the present invention addresses this problem using the communication module 204. The communication module 204 may include a timer 212, a computation module 214, and a lock handler 216. The timer 212 determines a timeout value for communications from a client 102 to the server 202. In particular, the timer 212 computes a timeout value for use in determining when to stop waiting for an ACK message from the client 102.

The timeout value comprises an average message round-trip time delay between the server 202 and the particular client 102 plus a default delta value. It is intended that the timeout value represent an expected reasonable delay (referred to herein as a round-trip time delay) between when the communication module 204 sends an output message to the client 102 and when an ACK message can be expected. This timeout value is determined based on past communication exchanges with this particular client.

It is well known that the communication path and throughput on the communication path between the client 102 and the server 202 changes dynamically as communication nodes come on-line and go off-line and communication traffic congestion changes. It is desirable that the timeout value not be so short that a high number of ACK messages are missed by the communication module 204. Preferably, the timeout value is not set based on the round-trip time delay of the most recent exchange with a particular client 102 because such a value is typically not representative of the variation in network communication delays that are historically experienced. Consequently, such a timeout value would typically be too short, even if a delta value is included.

Accordingly, in the preferred embodiments, the timeout value is determined based on an average of the message round-trip time delays computed between the server 202 and a client 102. Preferably, a separate average message round-trip time delay is computed for each client 102 that interacts with the server 202. The average may be computed based on all round-trip time delays for a particular connection session, for all round-trip time delays over a plurality of connection sessions, for a predefined number of previous message round-trip time delays, or the like.

To account for unexpected round-trip time delays, the timeout value includes a default delta value. The default delta value is used for all client requests serviced by the server 202. Preferably, the default delta value is predefined in software implementing the communication module 204. The default delta value may be set for a certain number of seconds based on historical experience, the type of workload on the server, the type of network connections involved, or the like. Preferably, the default delta value is a conservative value such as sixty seconds or so.

The computation module 214 calculates an ACK timer based on a current time and a send time. The send time is determined by the communication module 204 and represents the time that an output message is sent to the client 102. Once the output message is sent, the communication module 204 locks the server resource 208 used to generate the output message. Typically, the server resource 208 is locked such that the output message can be regenerated if the client 102 indicates that the output message was not properly received. The ACK timer is the difference between the send time and the current time. Consequently, the computation module 214 may compute and re-compute the ACK timer periodically, for example, every second.

The computation module 214 may provide the ACK timer to a lock handler 216. The lock handler 216 frees a locked resource 208 associated with a specific message exchange. The lock handler 216 frees the locked resource 208 once two conditions are met: first the server 202 has not received an ACK message from the client 102, and second the ACK timer exceeds the timeout value. In certain embodiments discussed later, once the locked resource 208 is freed, the lock handler 216 and/or other components may log, account for, and provide notification of the characteristics and circumstances that lead to the lock handler 216 automatically freeing the locked resource 208.

The communication module 204 automatically frees locked server resources 208 such that traditional manual intervention is not required. This allows the server 202 to operate more autonomously and experience less down time. In addition, the predefined delta value means there is no additional tuning of the timeout value required by an administrator for the server 202. The predefined delta value also accounts for unexpected round-trip time delays such that resources 208 are not freed prematurely.

As mentioned above, the default delta value applies to all timeouts for all transactions between clients 102 and the server 202. However, a predefined default delta value may not account to the traffic delay variance of a particular server 202. Consequently, a server administrator, such as a database administrator for an IMS system as used in the example above, may desire to change or override the predefined default delta value. In one embodiment, the server controller 210, a connection controller 218, and a transaction controller 220 may be used to provide different levels of control over the default delta value used in computing the timeout value.

Varying levels of control over the default delta value may be desirable due to the large variety of different computing environments in which the server 202 may operate. Typically, servers 202 are configured to communicate with a variety of different clients 102. Certain clients 102 may require significant post-processing time in order to confirm that the output message from the server 202 is properly received. Other clients 102 may be delayed in providing the ACK due to programming errors. Delays may also be caused by clients 102 failing to follow the communication protocol and send an ACK message and by spikes in network congestion.

The server controller 210 allows a server administrator, among other functions, to set a server delta value for all communications between the server 202 and clients 102. In one embodiment, the server controller 210 is a management console that include a user interface (GUI or command line). The server controller 210 allows a server administrator to monitor operation of the server 202, identify errors such as indefinitely locked resources, and take remedial action, as well as other management operations in relation to the server 202.

The server administrator may dynamically set the server delta value while the server 202 is operating by entering a specific command in the user interface of the server controller 210. Alternatively, the server delta value may be set using a parameter provided to the server 202 when the server 202 is first initiated. In addition or alternatively, the server delta value may be set using a configuration parameter that defines parameters for communications between the server 202 and a particular client 102.

Once a server administrator sets the server delta value, this value is used in place of the default delta value in computing the timeout value. The server delta value applies, like the default delta value, to all timeouts for all transactions between clients 102 and the server 202. In this manner, the value used as the delta value can be adjusted higher or lower than the default delta value to account for the needs of different servers 202 based on specific computing environments and/or clients 102.

In one embodiment, a connection controller 218 allows a connection delta value to be set for exchanges between a client 102 and the server 202 for a particular connection. Typically, a single connection involves a plurality of transactions between the client 102 and the server 202. The connection delta value may be set by an indicator in an initial message from the client 102 which establishes a connection. One may desire to set a connection delta value that is greater than a default delta value, for example, if the path between the client 102 and the server 202 is known to experience a high volume of dropped messages.

As explained above, the default delta value controls how server resources 208 are managed. Often the server 202 is owned and operated by one entity and the clients 102 are owned by other entities such as end users or suppliers. Those who own the server 202 may or may not desire that clients 102 exercise control over server resources 208. Consequently, certain conditions (explained below in relation to FIG. 4) control whether the connection delta value is used in place of the default delta value and the server delta value.

The transaction controller 220 permits yet another level of control over the timeout value, again subject to certain conditions explained in more detail below. The transaction controller 220 allows a transaction delta value to be set for a particular transaction. As used herein, a transaction refers to one or more messages exchanged between a client 102 and the server 202 to accomplish a unit of work. For example, a money transfer transaction includes messages to debit one account and credit a second account.

Certain transactions may be more or less important than others. So, even though a default delta value exists and a server delta value and/or connection delta value may exist, a transaction delta value may be desirable to account for a transaction of particularly high or particularly low importance. Of course, if the transaction is particularly high in importance, the transaction delta value may be very high, such as twenty-four hours. The transaction delta value may be set in response to an indicator in a transaction message from the client 102. If the transaction delta value is set, the transaction delta value is used, subject to other conditions explained below, in place of the default delta value, server delta value, and connection delta value for messages sent to the client 102 for which an ACK message is expected.

Figure 3:
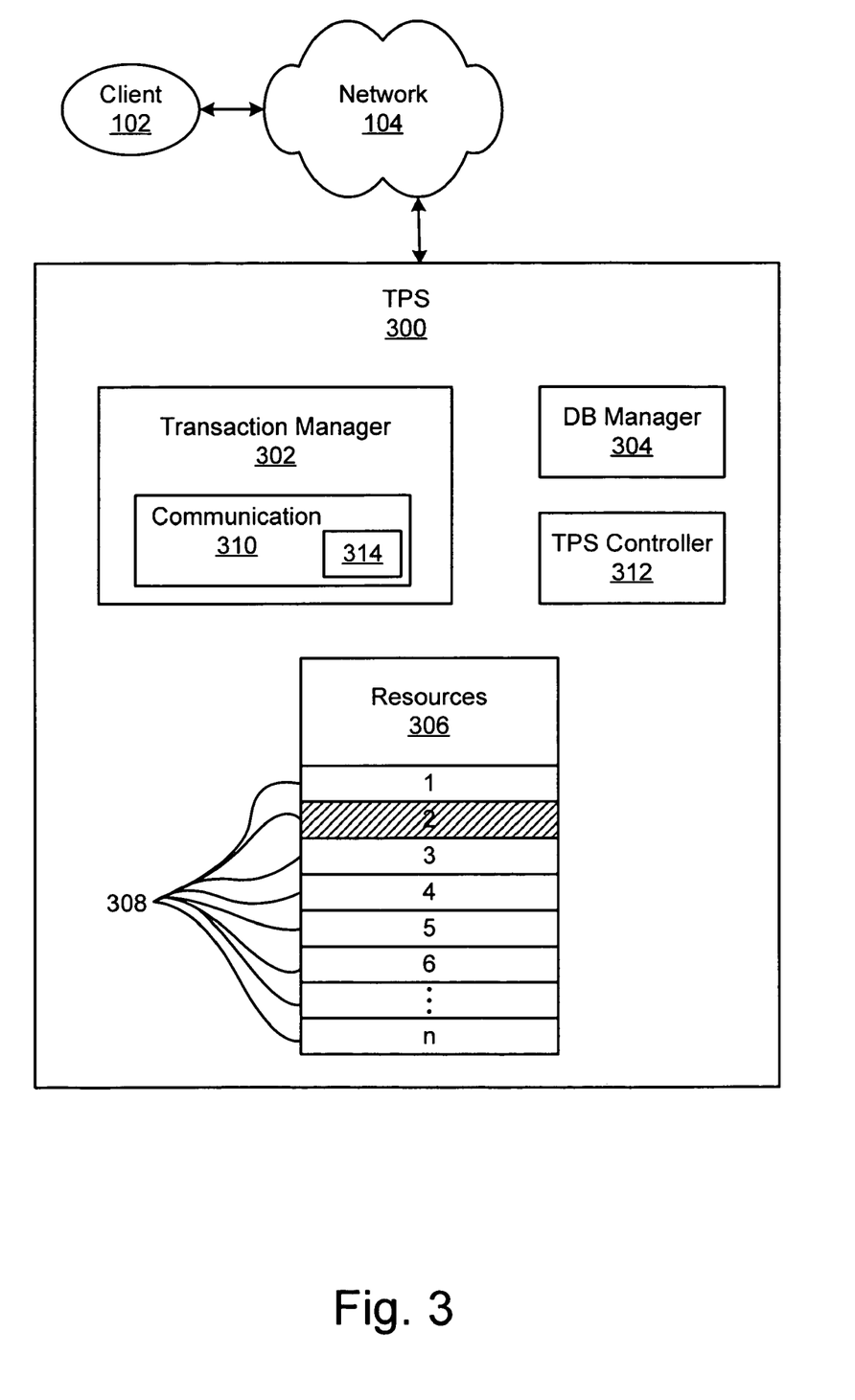
FIG. 3 is a schematic block diagram illustrating one embodiment of a system in accordance with the present invention.

FIG. 3 illustrates one embodiment of a system 300 configured to free server resources locked awaiting a failed acknowledgement from a client 102. The system 300 comprises a transaction processing system (TPS) 300 that communicates with clients 102 over a network 104 to satisfy database transactions initiated by the client 102. As mentioned above, the clients 102 communicate using a protocol in which certain transaction messages require the client 102 to send an ACK message in response to a received message.

The TPS 300 includes a transaction manager 302 and a database manager 304. The transaction manager 302 may provide communication features that enable the TPS 300 to exchange messages with the clients 102. Preferably, the transaction manager 302 is configured to communicate with a variety of clients 102 over a variety of networks 104 and corresponding network protocols.

The database manager 304 handles concurrent access to database data and sending and receiving of data from a plurality of databases. The transaction manager 302 and database manager 304 cooperate to free and lock resources 306 of the TPS 300 as needed. The resources 306 comprise substantially the same resources 208 as described in relation to FIG. 2. In FIG. 3, the resources 306 are divided into a finite number of program regions 308. Program region 308 number 2 is locked. If all the program regions 308 become locked at the same time, the TPS 300 may be unable to service additional transactions.

In one embodiment, the TPS 300 includes a communication module 310 that comprises substantially the same functionality as the communication module 204 described in relation to FIG. 2 for determining whether an ACK timer exceeds a timeout value. A TPS controller 312 in the TPS 300 enables a TPS administrator to perform monitoring, diagnostic testing, error recovery, and other general management operations on the TPS 300. Preferably, the TPS controller 312 includes substantially the same functionality as described in relation to the server controller 210 illustrated in FIG. 2.

In one embodiment, the TPS 300 comprises a specific server such as a transaction and database management module, namely IMS® from IBM. The transaction manager 302 and database manager 304 may correspond to similar components in the IMS product. The TPS controller 312 may correspond to a management console also available with the IMS product.

In addition to the embodiment of FIG. 2, the communication module 310 may send a notification of the locked TPS resource 306 instead of automatically freeing the TPS resource 306 so long as the server delta value is set to a predefined value such as zero. Once the ACK timer exceeds the timeout value and no ACK messages have been received, the notification message is sent. The notification message may be sent to the client from which an ACK message was expected and/or to the TPS controller 312. The notification preferably includes sufficient communication attributes to enable a TPS administrator to manually free the locked resource 306.

By default, the TPS system 300 may provide a notification of the timeout condition for a lock on the resource 306 and automatically free the locked resource 306. However, a TPS administrator may set the server delta value using the TPS controller 312 to a predefined value, such as zero, to change the behavior to send a notification and not automatically free the resource 306. If the server delta value is null, not set, or a value other than the predefined value, the TPS 300 sends a notification and automatically frees the resource 306. In this manner, the TPS administrator has greater flexibility in how the TPS 300 handles timeout conditions for ACK messages.

As with the communication module 204 of FIG. 2, the communication module 310 includes the same levels of delta values that can be adjusted to vary the timeout value. The communication module 310 includes a default delta value, a server delta value, a connection delta value, and transaction delta value. A connection controller 314 may automatically set a connection delta value in response to a message indicator from a client. The message indicator may be provided during initial message exchanges that set up a transaction connection.

As mentioned above, the present invention includes a timeout value that combines a delay that dynamically changes based on communication conditions between the server 202 and clients 102 and a fixed delay referred to herein as a default delta value. In addition, the present invention enables the timeout value to be adjusted by replacing the default delta value with different levels of other delta values.

Figure 4:
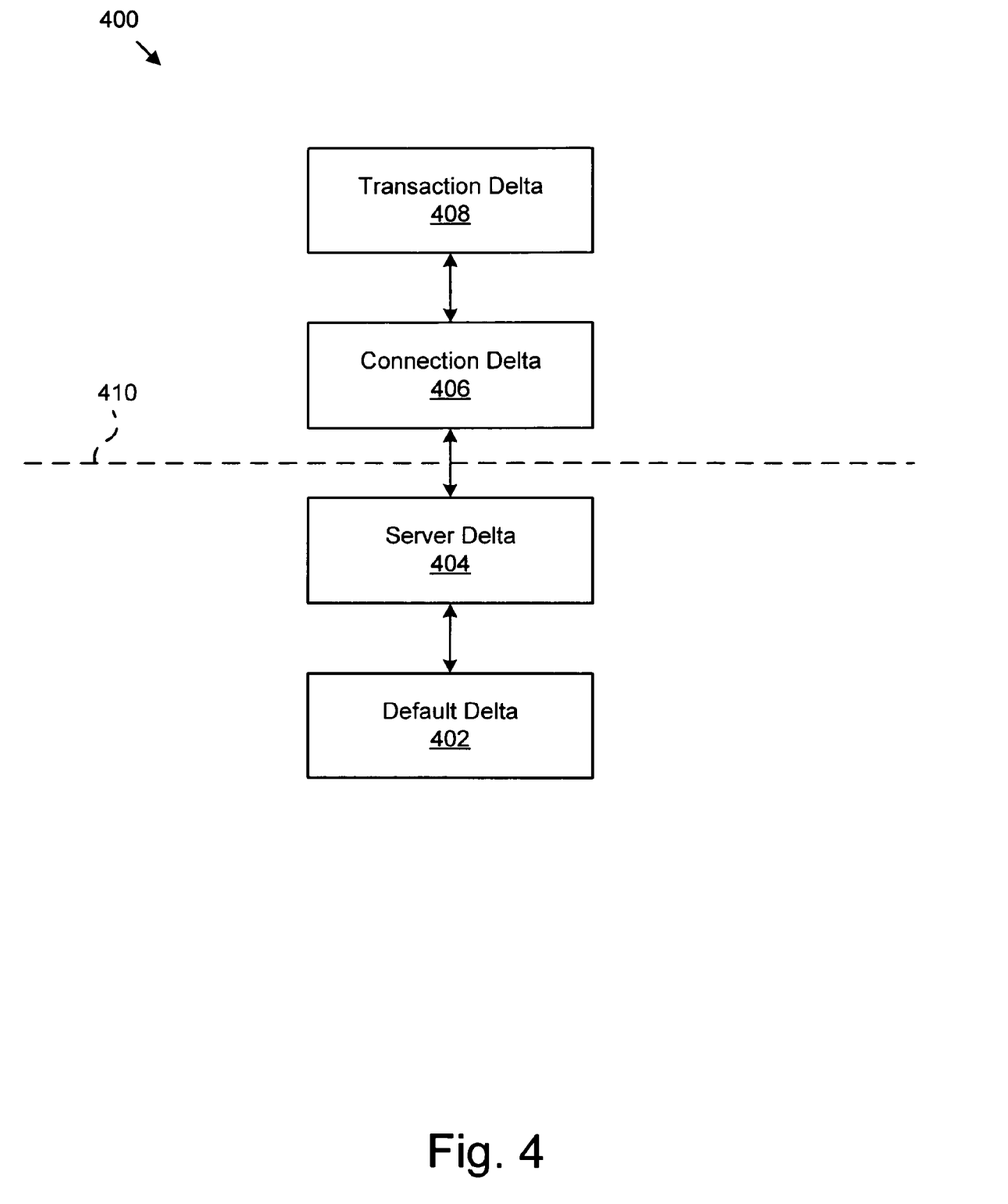
FIG. 4 is a schematic block diagram illustrating an example of a hierarchical order for selecting a delta value for use in computing the timeout value in one embodiment of the present invention.

FIG. 4 illustrates a hierarchy 400 that identifies which delta value will be used based on the settings of the other delta values. The hierarchy 400 begins with the default delta 402. This default delta 402 will be used when no other delta values are set. Preferably, the default delta 402 is predefined or hardcoded into software or hardware that implements the present invention. If any other delta values higher up (moving from the bottom of the page toward the top of the page) in the hierarchy 400 are set, these delta values will override the default delta 402 so long as certain conditions are met.

A server delta 404 may be set by a server administrator. Typically, administrators desire the timeout value to be as short as possible. Certain conditions may however justify a longer timeout value. So, the server administrator may adjust the timeout value by setting the server delta 404.

Typically, if the server delta 404 is set, the server delta 404 is used regardless of the value for the default delta 402. However, if the server delta 404 is set to a predefined value such as zero, for purposes of selecting a delta value in the hierarchy 400, the server delta 404 is treated as though the server delta 404 is not set. So, if the server delta 404 is set to a predefined value such as zero and no other delta values are set, the default delta 402 is used. Setting the server delta 404 to a predefined value may not affect the timeout value but may change the default behavior of the server 202 (See FIGS. 2-3). In one embodiment, if the server delta 404 is set to zero, the server 202 may provide notification that a locked resource has experienced a timeout condition, but the resource 208 may not be automatically freed.

The connection delta 406 is next in the hierarchy 400 followed by the transaction delta 408. Between the connection delta 406 and the server delta 404 is a line 410 that represents a transition in control over the server 202 and its resources 208. Specifically, delta values 402, 404 below the line 410 can be set or modified by a server administrator managing a server 202. Delta values 406, 408 above the line 410 are set by people or systems outside the control of the server administrator.

Consequently, the line 410 also represents a condition that enables the server administrator to retain control over behavior and operation of his/her own server 202. Specifically, if the server delta 404 is set, no delta values 406, 408 above the line 410 greater than the server delta 404 will be used as the delta value. Instead, the server delta 404 will be used. In this manner, clients 102 are permitted to set smaller delta values (fewer seconds) than the server delta 404. In other words, some person or system outside the control of the server administrator is unable to cause locked resources to remain locked longer than may be desired by the server administrator.

However, if the server delta 404 is not set, delta values 406, 408 above the line 410 will be selected as the delta value according to the hierarchy 400 (i.e., first delta value provided moving from top to bottom). This condition provides that if a server administrator decides not to set the server delta 404, the server administrator is not concerned about the length of time for the timeout that others outside of his/her control may set. In certain embodiments, there may be a predefined limit to the size of all the delta values 402-408. For example, all the delta values may be limited to values between 0 and 86400 seconds (24 hours). In one embodiment, if the server delta 404 is set to zero, the default delta 402 may be used regardless of the value for the transaction delta 408 and the connection delta 406.

The connection delta 406 may be provided by a client 102 during a connection phase to establish a connection to conduct transactions with the server 202. The connection delta 406 is selected if no server delta 404 is set or the connection delta 406 is less than a set server delta 404.

The transaction delta 408 is used for all messages requiring an ACK message during a specific transaction. The transaction delta 408 is selected if no server delta 404 is set or the transaction delta 408 is less than a set server delta 404. Of course, other messages from the same client 102 as the specific transaction may use a different delta 402-408.

Figure 5:
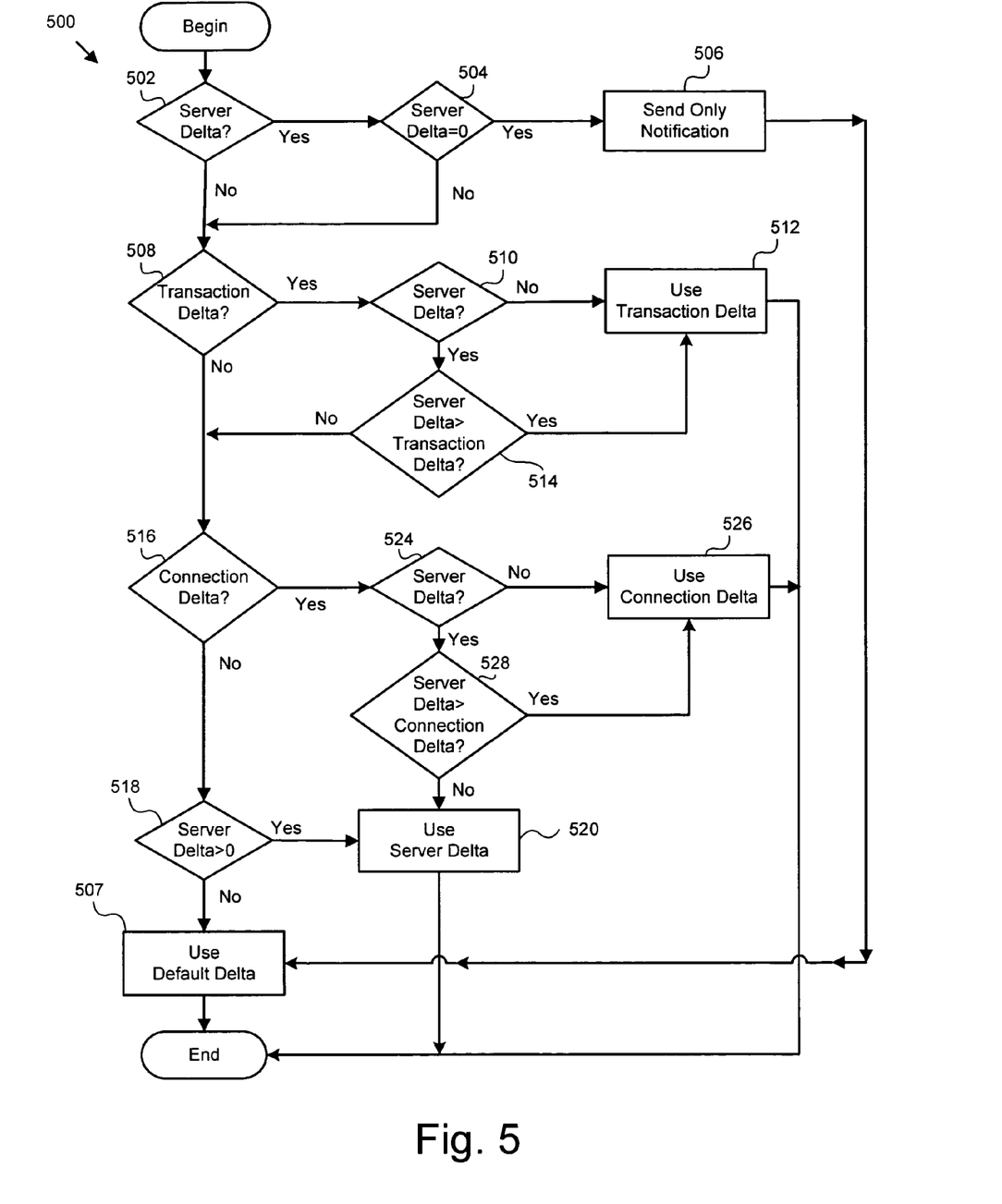
FIG. 5 is a schematic flow chart diagram illustrating one embodiment of an algorithm for selecting a delta value for use in computing the timeout value in the present invention.

FIG. 5 illustrates a schematic flow chart diagram illustrating one embodiment of an algorithm for selecting a delta value for use in computing the timeout value. Delta values are selected, if provided, in the order illustrated in the hierarchy 400 of FIG. 4. FIG. 5 illustrates a method 500 for selecting the delta value.

The method 500 begins once a connection is established between a client 102 and a server 202 (See FIG. 2). In addition, the method 500 may be initiated once a delta value is provided by a server administrator, startup parameter, configuration file, connection negotiation phase, transaction indicator, or the like. In other words, the method begins once one of the deltas 404-408 (See FIG. 4) is provided either by a source outside or inside the server 202.

In the illustrated embodiments, the deltas 404-408 may be restricted to positive values, zero and greater. In one embodiment, a determination 502 is made whether a server delta 404 has been set. If so, a determination 504 is made whether the server delta 404 is set to a predefined value having secondary meaning such as zero, in one embodiment. If set to zero, the server delta 404 has no affect on the timeout value. However, in certain embodiments, if the server delta 404 is zero, the communication module 204 (See FIG. 2) sends 506 a notification when a timeout condition is reached for a locked resource 208 and does not automatically free the locked resource 208. The default delta 402 is used 507 to compute the timeout value and the method ends.

If the server delta 404 is not zero, the method 500 still continues in order to determine which delta value 402, 404, 406, 408 to use in computing the timeout value. Next, a determination 508 is made whether a transaction delta 408 is set. If so, the method 500 determines 510 whether the server delta 404 has been set. If not, the transaction delta 408 is used 512 to compute the timeout value and the method 500 ends.

If the server delta 404 is set, a determination 514 is made whether the server delta 404 is greater than the transaction delta 408. If so, the transaction delta 408 is used 512 to compute the timeout value and the method 500 ends. If the transaction delta 408 exceeds the server delta 404 or no transaction delta 408 is provided, a determination 516 is made whether a connection delta 406 has been provided. If not, a determination 518 is made whether the server delta 404 is greater than zero. If so, the server delta 404 is used 520 to compute the timeout value. If the server delta 404 is not greater than zero (i.e., not set), the default delta value 402 is used 522 to compute the timeout value.

If the method 500 determines 516 that the connection delta 406 is provided, a determination 524 is made whether the server delta 404 is set. If not, the connection delta 406 is used 526 to compute the timeout value. If the server delta 404 is set, a determination 528 us made whether the server delta 404 is greater than the connection delta 406. If so, the connection delta 406 is used 526. If not, the server delta 404 is used 520 and the method 500 ends.

Figure 6:
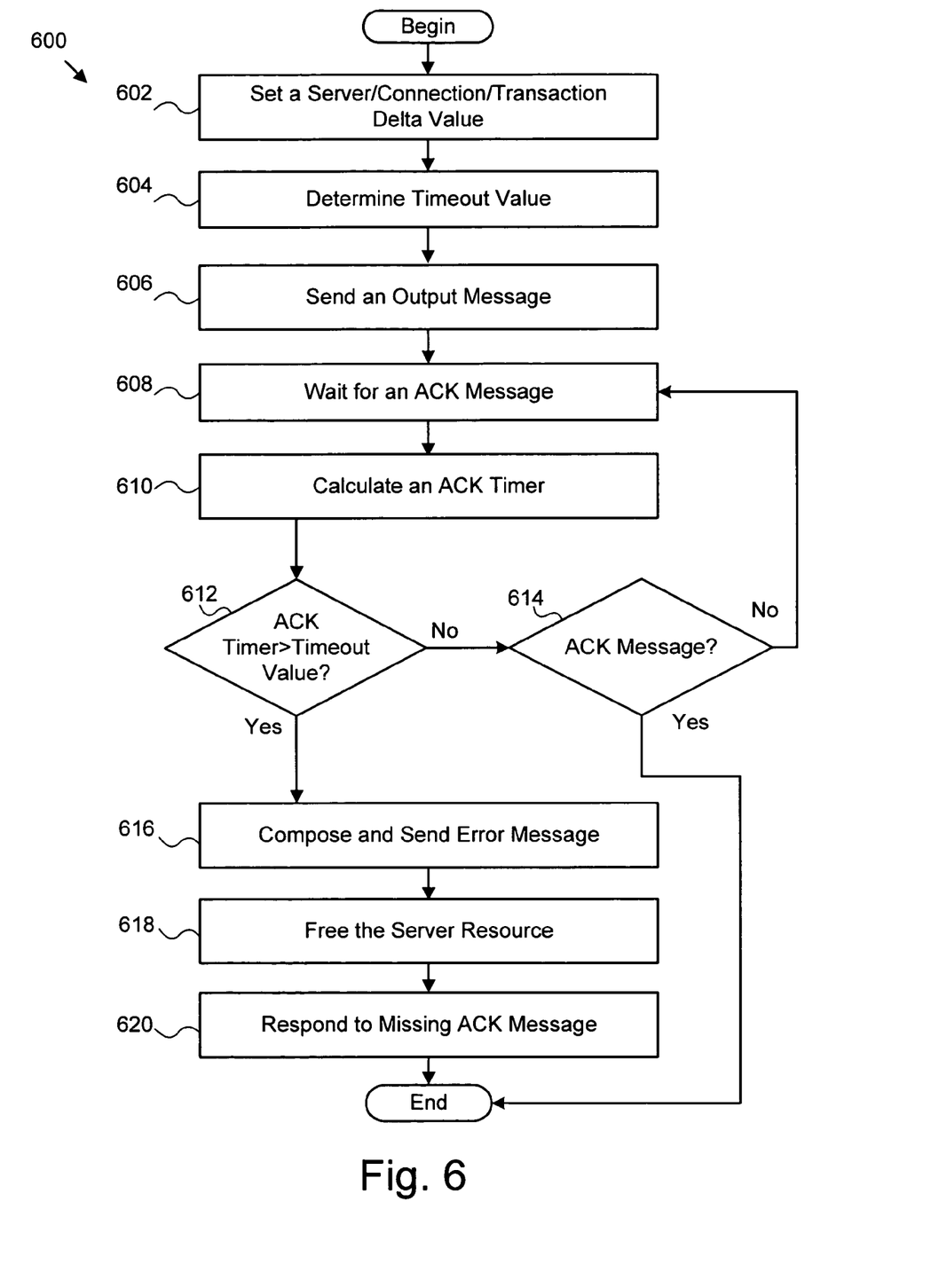
FIG. 6 is a schematic flow chart diagram illustrating one embodiment of a method for freeing a server resource locked awaiting a failed acknowledgement from a client.

FIG. 6 illustrates one embodiment of a method 600 for automatically freeing a server resource locked awaiting a failed ACK message from a client 102. Typically, the method 600 begins once a communication module 204 (See FIG. 2) determines that an output message that requires an ACK message from the client 102 before locked server resources 208 can be released is prepared.

First, a server delta 404, connection delta 406, and/or transaction delta 408 is set 602 based on which values are provided. As discussed above, these various levels of delta values may be set using a variety of methods, all considered within the scope of the present invention.

Next, a timeout value is determined 604 based on an average message round-trip time delay between the server 202 and the client 102 plus a default delta value. Typically, as discussed in relation to FIG. 5, the default delta value may be replaced by a server delta 404, connection delta 406, or transaction delta 408 in accordance with the logic illustrated in the method 500 depicted in FIG. 5 and the hierarchy 400 illustrated in FIG. 4.

Then, communication module 204 sends 606 an output message to the client 102 at a send time. The communication module 204 or another module typically locks server resource 208 used to generate the output message. The communication module 204 then waits 608 for an ACK message from the client 102.

While the communication module 204 waits, an ACK timer is calculated 610. The ACK timer comprises the difference in time between the send time and a current time. The ACK timer is preferably calculated periodically over small intervals such as seconds or hundredths of seconds.

Next, a determination 612 is made whether the ACK timer exceeds the timeout value. If not, a determination 614 is made whether an ACK message has been received, if so, the method 600 ends. If no ACK message has been received, the method may return to wait 608 for an ACK message.

If the ACK timer exceeds the timeout value, then in certain embodiments, the communication module 204 may compose and send 616 a notification or error message about the communication attributes present when the ACK timer exceeded the timeout value. The communication attributes may include information such as the address of the server 202, the address of the client 102, the size, name, and type of locked resource(s) 208, and the like. In addition, in embodiments in which the communication module 204 automatically takes action to free the locked resource and queue the output message, the notification or error message may also describe what remedial actions have been (or will be) automatically taken.

The notification and/or error message may be sent to the client 102, if available, and to a server administrator by way of a server controller 210, or to various other destinations that may have an interest in the notification and/or error message. Additionally, the notification or error message may be stored in a log or database for future reference.

Next, in certain embodiments, the communication module 204 may free 618 the locked resource 208. Consequently, the locked resource 208 may be added to a pool of resources 208 for re-use. In this manner, the present invention may automatically free a locked resource that previously required user intervention. Consequently, the server 202 may operate autonomously and automatically protect its resources 208 in order to maintain higher availability.

The communication module 204 may respond 620 to the missing ACK message after which the method 600 ends. Typically, the type of response depends in part on the configuration of the server 202, the type of server 202, and the type of client request which resulted in a timeout condition while waiting for an ACK message. As discussed above, part of the response may include sending a notification or error message.

In one embodiment, the server 202 is a database server such as IMS®. The output message may comprise a result for a database transaction. Consequently, if the client 102 indicates that the database transaction is a send-then-commit type, the server 202 may respond 620 by backing out the database transaction without performing a commit operation on the database. In addition, the server 202 may include in the notification or error message confirmation of the results of the backout operation.

Additionally, if the client 102 indicates that the database transaction is a commit-then-send type, the server 202 may respond 620 by storing a result of the database transaction, such as the output message, in a queue for subsequent transmission to the client 102 and include confirmation of the result of the commit operation in the notification or error message. Of course, the server 202 may be configured to conduct various operations in response to determining that the ACK timer exceeds the timeout value. All such operations are considered within the scope of the present invention.

Advantageously, the present invention in various embodiments facilitates automatically freeing server resources using a timeout value closely related to actual real-time message delays plus a delta value that can be adjusted at a plurality of levels. Although the delta value can be adjusted, the present invention beneficially prevents components or modules outside the control of the server 202 from exercising greater control over server resources than that specified by a server administrator. Server resources locked awaiting a failed acknowledgement from a client 102 may be autonomously and automatically freed without user intervention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to automatically free a server resource locked awaiting a failed acknowledgement from a client, the apparatus comprising:
   a timer configured to determine a timeout value for communications from a client to a server, the timeout value comprising an average message round-trip time delay between the server and the client plus a default delta value;
   a communication module configured to send an output message to the client at a send time and lock a server resource in anticipation of an acknowledgement (ACK) message from the client, the server resource being used to generate the output message;
   a computation module configured to calculate an ACK timer comprising a difference between the send time and a current time; and
   a lock handler configured to free the server resource in response to the ACK timer exceeding the timeout value and the communication module not receiving the ACK message from the client.

2. The apparatus of claim 1, wherein the default delta value is predefined such that the server automatically frees the locked server resource without user intervention and wherein a separate timeout value is determined for each of a plurality of clients communicating with the server.

3. The apparatus of claim 1, further comprising a server controller configured to set a server delta value for all communications between the server and one or more clients, the server delta value being used in place of the default delta value.

4. The apparatus of claim 3, wherein the server delta value is set using one of a server startup parameter, a command from a server administrator, and a configuration parameter for communications between the server and a particular client.

5. The apparatus of claim 3, further comprising a connection controller configured to set a connection delta value for messages exchanged between the server and the client during a particular connection, the connection delta value being used in place of the default delta value and the server delta value in response to the server delta value being set and the server delta value exceeding the session delta value.

6. The apparatus of claim 3, further comprising a connection controller configured to set a connection delta value for messages exchanged between the server and the client during a particular connection, the connection delta value being used in place of the default delta value and the server delta value in response to the server delta value not being set.

7. The apparatus of claim 3, further comprising a transaction controller configured to set a transaction delta value for a particular transaction between the client and server in response to an indicator in a transaction message from the client, the transaction delta value overriding the default delta value, the connection delta value, and the server delta value in response to the server delta value being unset or the server delta value exceeding the transaction delta value.

8. A system to free a server resource locked awaiting a failed acknowledgement from a client, the system comprising:
   a client configured to communicate over a network using a protocol in which certain transaction messages require the client to send an acknowledgement (ACK) message in response to a received message;
   a transaction processing system (TPS) configured to communicate over the network to satisfy database transactions initiated from the client; and
   a transaction manager within the TPS configured to determine a timeout value for a communication session between the TPS and the client, the timeout value comprising an average message round-trip time delay between the TPS and the client plus a dynamically adjustable default delta value, and further configured to send an output message to the client at a send time and lock a TPS resource in anticipation of the ACK message from the client, the TPS resource being used to generate the output message, and further configured to calculate an ACK timer comprising a difference between the send time and a current time and to send a notification of the locked TPS resource in response to the ACK timer exceeding the timeout value, the transaction manager not receiving the ACK message from the client, and a server delta value set to a predefined value.

9. The system of claim 8, wherein the transaction manager is configured to automatically free the TPS resource in response to the server delta value not set to the predefined value.

10. The system of claim 9, further comprising a TPS controller configured to set a server delta value for all communications between the TPS and one or more clients, the server delta value being used in place of the default delta value.

11. The system of claim 10, further comprising a connection controller configured to set a connection delta value for messages exchanged between the TPS and the client during a particular connection, the connection delta value being used in place of the default delta value and the server delta value in response to the server delta value being set and the server delta value exceeding the connection delta value.

12. A signal bearing medium tangibly embodying a program of machine-readable instructions executable by a digital processing apparatus to perform operations to automatically free a server resource locked awaiting a failed acknowledgement from a client the operations comprising:
   an operation to determine a timeout value for communications between a server and a client, the timeout value comprising an average message round-trip time delay between the server and the client plus a default delta value;
   operation to send an output message to the client at a send time and lock a server resource in anticipation of an acknowledgement (ACK) message from the client, the server resource being used to generate the output message;
   operation to calculate an ACK timer comprising a difference between the send time and a current time; and
   operation to free the server resource in response to the ACK timer exceeding the timeout value and not receiving the ACK message from the client.

13. The signal bearing medium of claim 12, wherein the instructions further comprise operations to set a server delta value for all communication sessions between the server and one or more clients, the server delta value being used in place of the default delta value.

14. The signal bearing medium of claim 13, wherein the server delta value is set using one of a server startup parameter, a command from a server administrator, and a configuration parameter for communications between the server and a particular client.

15. The signal bearing medium of claim 13, wherein the instructions further comprise operations to set a connection delta value for messages exchanged between the server and the client during a particular connection, the connection delta value being used in place of the default delta value and the server delta value in response to the server delta value being set to a value exceeding the connection delta value.

16. The signal bearing medium of claim 13, wherein the instructions further comprise operations to set a connection delta value for messages exchanged between the server and the client during a particular connection, the connection delta value being used in place of the default delta value and the server delta value in response to the server delta value not being set.

17. The signal bearing medium of claim 12, wherein the average message round-trip time delay is calculated using a predefined number of previous message round-trip time delays.

18. The signal bearing medium of claim 12, wherein the instructions further comprise operations to compose and send an error message selectively to a server controller and a client, the error message describing communication attributes when the server resource is freed without an ACK message from the client.

19. The signal bearing medium of claim 18, wherein the server comprises a database server and the output message comprises a result for a database transaction and wherein the instructions further comprise operations to backout the database transaction without performing a commit operation and include confirmation of the backout operation in the error message in response to the database transaction comprising a send-then-commit type of transaction.

20. The signal bearing medium of claim 18, wherein the server comprises a database server and the output message comprises a result for a database transaction and wherein the instructions further comprise operations to commit the database transaction, include confirmation of the commit operation in the error message, and store the result in a queue for subsequent transmission to the client in response to the database transaction comprising a commit-then-send type of transaction.

* * * * *